(12) United States Patent
Kimura et al.

(10) Patent No.: US 6,798,763 B1
(45) Date of Patent: Sep. 28, 2004

(54) SYSTEM AND METHOD FOR MOBILE COMMUNICATION AVOIDING DELAY IN DATA TRANSMISSION

(75) Inventors: Shinya Kimura, Yokohama (JP); Miki Amano, Yokohama (JP)

(73) Assignee: Sharp Kabushiki Kaisha, Osaka (JP)

(*) Notice: Subject to any disclaimer, the term of this patent is extended or adjusted under 35 U.S.C. 154(b) by 839 days.

(21) Appl. No.: 09/716,174

(22) Filed: Nov. 17, 2000

(30) Foreign Application Priority Data

Nov. 17, 1999 (JP) ............................................ 11-327238

(51) Int. Cl.⁷ .......................... H04L 12/28; H04L 12/56
(52) U.S. Cl. ..................... 370/338; 370/401; 455/433
(58) Field of Search ................................. 370/331, 338, 370/401, 352, 389, 392; 455/432.1, 433, 445

(56) References Cited

U.S. PATENT DOCUMENTS

| | | | | |
|---|---|---|---|---|
| 5,745,695 | A | | 4/1998 | Gilchrist et al. ............ 395/200 |
| 6,088,725 | A | | 7/2000 | Kondo et al. ................ 709/220 |
| 6,122,268 | A | * | 9/2000 | Okanoue et al. ............ 370/338 |
| 6,144,671 | A | * | 11/2000 | Perinpanathan et al. .... 370/409 |
| 6,452,920 | B1 | * | 9/2002 | Comstock .................... 370/349 |
| 6,473,413 | B1 | * | 10/2002 | Chiou et al. ................. 370/331 |
| 6,501,767 | B1 | * | 12/2002 | Inoue et al. ................. 370/465 |

FOREIGN PATENT DOCUMENTS

JP           10051449           2/1998

OTHER PUBLICATIONS

*Mobile IP The Internet Unplugged*, Prentice Hall Series in Computer Networking and Distributed Systems, James D. Solomon, Chapters 12 and 13, pp. 260–272; 282–291.

*Mobile Internet Access and QoS Guarantees Using Mobile IP and RSVP With Location Registers*, Ravi Jain, et al., 0–7803–4788–9/98 IEEE, pp. 1690–1695.

European Search Report dated Mar. 26, 2003.

* cited by examiner

*Primary Examiner*—Chau Nguyen
*Assistant Examiner*—Andrew Wahba
(74) *Attorney, Agent, or Firm*—Edwards & Angell, LLP; David G. Conlin

(57) ABSTRACT

A partner appliance that communicates with a mobile node is connected via a communication network with a home agent and a foreign agent that relay the communication between the mobile node and the partner appliance. When the mobile node, moving during the communication, comes to be connected to a foreign link of the foreign agent, a moved address is assigned thereto. If the mobile node receives call setup request information regarding data transmission from the partner appliance via the home agent while moving, it determines, based on the received call setup request information, whether real-time transmission is required for the data. If so, the mobile node notifies the partner appliance of the moved address assigned thereto. When the moved address is notified, a communication path is established between the mobile node and the partner appliance, and the partner appliance sends the data to the mobile node via the communication path based on the moved address notified. Since the communication path includes the communication network and the foreign agent but does not include the home agent, transmission delay is avoided for the data requiring real-time transmission.

16 Claims, 12 Drawing Sheets

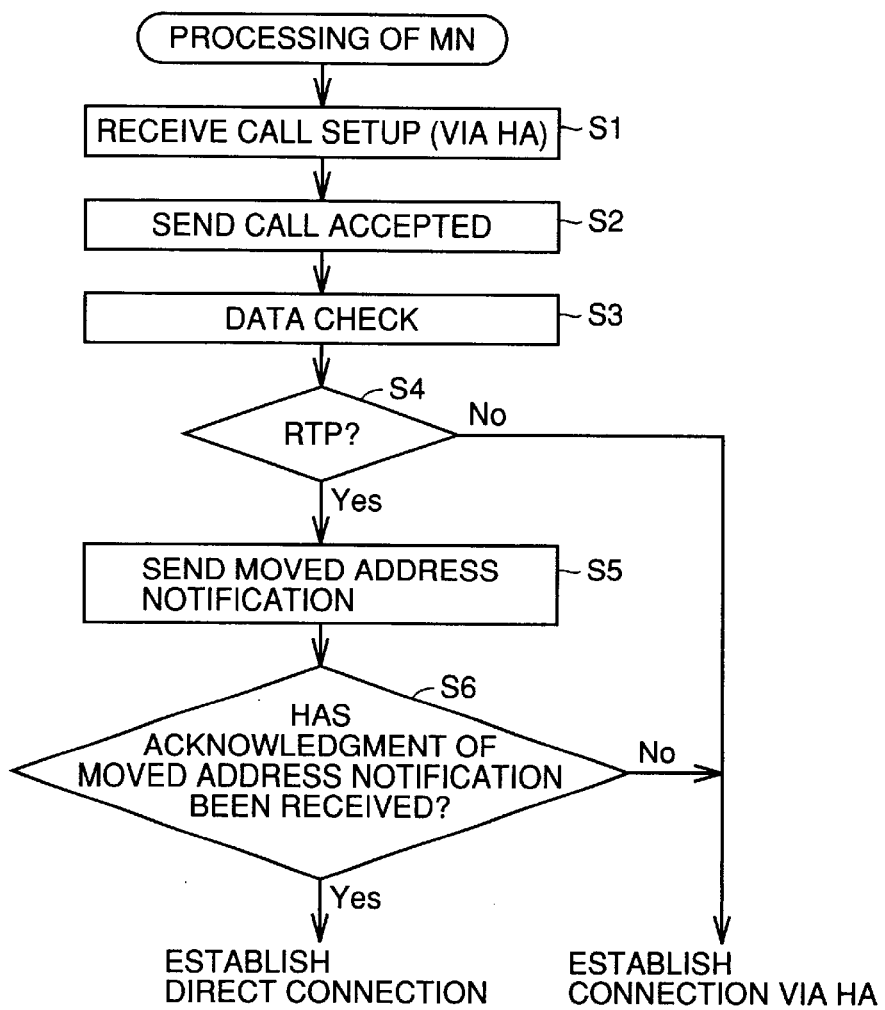

SYSTEM AND METHOD FOR MOBILE COMMUNICATION AVOIDING DELAY IN DATA TRANSMISSION

BACKGROUND OF THE INVENTION

1. Field of the Invention

The present invention relates to system and method for mobile communication, and more particularly, to a mobile communication system and a mobile communication method that avoid delay in data transmission between a mobile node and a communication terminal.

2. Description of the Background Art

A standard Internet Protocol (IP) currently utilized is called Internet Protocol version 4 (IPv4). A next generation protocol for replacement of IPv4, Internet Protocol version 6 (IPv6), has now been under examination and inspection.

The mobile communication in accordance with IPv4 and IPv6, or, so-called Mobile IP, is controlled in the following procedures.

FIGS. 13 and 14 show conventional procedures for establishing communication between a partner appliance and a mobile node under IPv4. In FIGS. 13 and 14, the communication procedures are shown as ①–④. ①–④ in FIG. 13 correspond to ①–④ in FIG. 14.

FIG. 14 shows a system to which the Mobile IP corresponding to IPv4 is applied. The system in FIG. 14 includes: a communication network NE, such as the Internet, that is a main network to which the IP is applied; IP sub-networks 10 and 20, such as local area network, to which the IP is applied; and a home agent HA, a foreign agent FA and a partner appliance PA connected to one another through communication network NE; and a mobile node MN.

Partner appliance PA and mobile node MN each are mobile information equipment such as IP telephone, video telephone or the like. Herein, for simplification of explanation, partner appliance PA is assumed to be information equipment that does not move. Home agent HA and foreign agent FA each are equipment such as a gateway, which receives data via communication network NE, understands the intention according to the situations, and performs processing based on an autonomous determination. Home agent HA and foreign agent FA correspond to stations that relay the communication between mobile node MN and partner appliance PA. Communication network NE connects partner appliance PA, home agent HA and foreign agent FA to one another. IP sub-networks 10 and 20 connect home agent HA and mobile node MN, and foreign agent FA and mobile node MN, respectively. Home agent HA is used when mobile node MN is in an area communicable via IP sub-network 10; whereas foreign agent FA is used when mobile node MN has moved out of the area and is now in another area communicable with foreign agent FA via IP sub-network 20. From the standpoint of IP sub-network 10 corresponding to home agent HA, IP sub-network 20 corresponds to a foreign link, and therefore, it is also called "a foreign link". Herein, IP sub-networks 10 and 20 are assumed to be wireless communication networks.

Assume that mobile node MN that was being connected to IP sub-network 10 corresponding to home agent HA moves in a direction indicated by a dashed arrow AR and comes to be connected to IP sub-network 20 to which foreign agent FA belongs. Mobile node MN has a home address HAD when it is being connected via IP sub-network 10 to home agent HA. Home address HAD is a global address that is an IP address of mobile node MN when it is in the area communicable via IP sub-network 10. When mobile node MN moves outside the area and comes to be connected via IP sub-network 20 to foreign agent FA, then mobile node MN acquires a care of address CAAD being also a global address. It then notifies home agent HA of the care of address CAAD via foreign agent FA, and receives, from foreign agent FA, a current address in the area where mobile node MN has moved in (hereinafter, referred to as a "moved address") MAD as its temporary IP address. Moved address MAD is an address for uniquely identifying a corresponding mobile node MN. Care of address CAAD is an IP address of foreign agent FA belonging to an area where mobile node MN has moved in, and indicates a current connect point for the relevant mobile node MN. Accordingly, a message for mobile node MN is transferred to care of address CADD by home agent HA, and foreign agent FA receives the message and sends it to the mobile node MN. The detailed communication at this time will be described with reference to FIG. 13.

The message for mobile node MN from partner appliance PA is sent as follows. Specifically, when home agent HA receives, from partner appliance PA, "call setup request" for a message in accordance with ITU-T Q.931, etc. (recommendation by International Telecommunication Union; hereinafter, simply referred to as Q.931, etc.) (①), it sends the call setup request as capsulated data to foreign agent FA by tunneling (②). Foreign agent FA performs decapsulation of the received call setup request, and sends the resultant to mobile node MN (③). In response to receipt of the call setup request, mobile node MN sends "call accepted", "call" and "response" to partner appliance PA, not via home agent HA, but via foreign agent FA belonging to the area where the mobile node MN has moved in (④). Hereinafter, the case where, in a system corresponding to IPv4, mobile node MN (or partner appliance PA) sends information (data, signals) to partner appliance PA (or mobile node MN) not via home agent HA but via foreign agent FA is expressed as "to send directly" or "direct sending".

Thus, communication is established between partner appliance PA and mobile node MN. Thereafter, data from mobile node MN to partner appliance PA is sent directly (④); whereas data from partner appliance PA to mobile node MN is sent via home agent HA and foreign agent FA (①, ② and (③)).

FIGS. 15 and 16 show conventional procedures for establishing communication between partner appliance PA and mobile node MN in the case of IPv6. In FIGS. 15 and 16, the communication procedures are shown as ①–④. ①–④ shown in FIG. 15 correspond to ①–④ shown in FIG. 16.

FIG. 16 shows a system to which the Mobile IP corresponding to IPv6 is applied. The configuration of the system in FIG. 16 is identical to that shown in FIG. 14, and therefore, detailed description thereof is not repeated. Referring to FIG. 16, mobile node MN has home address HAD while it is connected via IP sub-network 10 to home agent HA. When the mobile node MN that was connected to home agent HA via IP sub-network 10 moves in a direction indicated by the dashed arrow AR and comes to be connected to a foreign link (not shown), mobile node MN acquires a moved address MAD, i.e., a temporary IP address as a global address, from a server (not shown) on communication network NE, although the way of acquiring the moved address MAD is not limited thereto. Mobile node MN then notifies home agent HA of that moved address MAD as care of address CAAD indicating its current location. Thereafter, the message from partner appliance PA for mobile node MN is sent as follows.

Referring to FIG. 15, partner appliance PA sends "call setup request" to home agent HA for a message according to Q.931, etc. (①). Home agent HA receives the call setup request, and sends it to mobile node MN by tunneling (②). Mobile node MN, in response to receipt of the call setup request, directly sends "call accepted", "call" and "response" to partner appliance PA (③). Thus, connection between partner appliance PA and mobile node MN is established. Thereafter, data from partner appliance PA is sent to mobile node MN via home agent HA by tunneling (①, ②); whereas data from mobile node MN is sent directly to partner appliance PA. Here, at an appropriate timing, mobile node MN notifies partner appliance PA of "binding update" (③), as will be described later, by sending it directly. Once mobile node MN receives its response ("binding acknowledgment") from partner appliance PA (④), a direct connection between partner appliance PA and mobile node MN is established. Thereafter, like the data from mobile node MN to partner appliance PA, data from partner appliance PA is sent directly to mobile node MN (④), rather than being sent by tunneling via home agent HA. Hereinafter, the case where, in a system corresponding to IPv6, mobile node MN (or partner appliance PA) sends information (data, signals) to partner appliance PA (or mobile node MN) not via home agent HA or foreign agent FA is expressed as "to send directly" or "direct sending".

The expression reading "to notify of binding update" means that, in a mobile communication according to IPv6, mobile node MN notifies partner appliance PA of its moved address MAD at a certain timing after transmission between mobile node MN and partner appliance PA has started via home agent HA.

Another technique regarding the mobile communication is disclosed in Japanese Patent Laying-Open No. 10-51449, wherein communication is established by dynamically altering communication protocol addresses (IP addresses) along with movement of a computer. In this reference, an address management server collectively manages tables for home addresses and moved addresses, and a sending terminal has an address table cache that is cleared according to a lapse of time. On the sending terminal side, when data to be sent is supplied from a corresponding application, a socket hook processing unit snatches away a send-to address added to the relevant sending data, and if the address table cache is cleared, makes an inquiry to the address management server, and, according to the inquired result, converts the send-to address to an appropriate address if necessary. Thus, the application is allowed to communicate without noticing the change of addresses.

According to the technique disclosed in the reference as described above, however, it is necessary to inquire the address management server, separately, so as to find the current address, which increases traffic. Further, in the method for controlling communication between partner appliance PA and mobile node MN under IPv4 as shown in FIGS. 13 and 14, data from partner appliance PA for mobile node MN after its movement is constantly sent by tunneling via home agent HA. Thus, the communication path becomes redundant, causing delay in communication. Accordingly, transmission of application data for images and sounds for which real-time data transmission is required depends on where mobile node MN has moved, thereby causing degradation in quality of the transmission data. In other words, time lag between data sending/receiving by partner appliance PA and mobile node MN becomes considerable, which makes it difficult for the mobile node MN to synchronously reconstruct and process the application data.

Further, with the method for controlling communication between partner appliance PA and mobile node MN under IPv6 as shown in FIGS. 15 and 16, the redundant communication path as described above is prevented by the binding update. However, the timing at which the direct sending between partner appliance PA and mobile node MN becomes available by the binding update is determined by a policy of network designing, regardless of whether the data requires real-time processing or not. Thus, delay inevitably occurs when transmitting data involving images, sounds and the like that requires real-time transmission and real-time processing.

In view of the foregoing, in the communication control method for the Mobile IP under IPv4 or IPv6, improvement is desired in communication control procedures between partner appliance PA and mobile node MN when mobile node MN moves and comes to belong to a network segment that is distant from home agent HA. Specifically, communication control procedures are desired which prevent delay in sending/receiving data of images, sounds and the like (e.g., data being sent via IP telephone or video telephone) that would be easily affected by transmission delay in communication.

SUMMARY OF THE INVENTION

An object of the present invention is to provide system and method for mobile communication that avoid transmission delay of data for which real-time transmission is required.

To achieve the object, in the mobile communication system according to an aspect of the preset invention, a communication terminal that communicates with a mobile terminal to send data to the mobile terminal and a prescribed station that relays communication between the mobile terminal and the communication terminal are connected to each other via a communication network. The mobile terminal communicates with the prescribed station, and as it moves, it is switched and assigned with a different address for every visited area, for uniquely identifying the mobile terminal in the relevant area.

In the above-described system, the mobile terminal is provided with a call setup request receiving unit, a determination unit and an address notification unit, which operate while the mobile terminal is moving. The communication terminal is provided with a data sending unit.

When the call setup request receiving unit at the mobile terminal receives call setup request information for requesting setup of a call for data transmission from the communication terminal via the prescribed station, the determination unit determines, based on the call setup request information received, whether or not real-time communication is requested for the data. As a result of the determination, if it is determined that the real-time communication is being requested, an address currently assigned to the mobile terminal is notified by the address notification unit to the communication terminal. Upon receipt of the address notification, the data sending unit of the communication terminal sends the data via an established communication path to the mobile terminal, based on the notified address. This established communication path between the mobile terminal and the communication terminal includes the communication network but does not include the prescribed station.

Accordingly, the data for which real-time transmission is required is transmitted via the communication path including the communication network but excluding the prescribed station, or in other words, via a shortened communication path not relayed by the prescribed station. The notification of the address by the address notification unit to the communication terminal is carried out immediately after the call setup request is made. This prevents transmission delay of data for which real-time transmission is required. Further, establishment of the above-described communication path reduces communication load exerted both on the prescribed station and on the communication network.

In the above-described mobile communication system, the address notification unit has an on-the-move address notification unit. While data is being sent from the data sending unit to the mobile terminal, the on-the-move address notification unit notifies the communication terminal of a new address assigned to the mobile terminal with every further movement of the mobile terminal.

Accordingly, the mobile terminal is constantly assigned with new addresses while moving, so that it becomes possible to transmit data continuously, without disconnecting the call having been setup between the mobile terminal and the communication terminal.

In the above-described data communication system, the communication terminal further includes an address storage unit that stores the address notified by the address notification unit corresponding to the call. Every time the address notification unit notifies of a new address, the address stored in the address storage unit is updated using the notified address.

The address is stored in the address storage unit only temporarily. Therefore, the address storage unit can be configured with an inexpensive and simple storage element, e.g., RAM (random access memory), so that the cost of the communication terminal itself can be reduced.

In the above-described mobile communication system, the communication path is established corresponding to the call for which the call setup request information was received by the call setup request receiving unit. When the call is released, the address corresponding to the call is deleted from the address storage unit.

Accordingly, the address storage unit of the communication terminal needs to store the address only while the call is being maintained. Thus, storage capacitance required therefor is relatively small.

In the above-described mobile communication system, the data sending unit prevents failure in receiving packets (hereinafter, also referred to as "packet loss") during data transmission that may occur every time an address is notified.

Accordingly, even if an address is notified while the data is being sent, the packet loss during the data transmission is prevented, and thus, communication quality is improved. For prevention of the packet loss, the data sending unit may be configured to suspend data transmission whenever an address is notified, or to re-transmit the data.

In the above-described mobile communication system, the communication network may be the Internet. In this case, the communication between the communication terminal and the mobile terminal is carried out in accordance with the Mobile Internet Protocol. The Mobile Internet Protocol may be the one corresponding to Internet Protocol version 4 or Internet Protocol version 6.

The above-described mobile communication system may be configured as follows. Specifically, a plurality of stations including the prescribed station for relaying communication between the mobile terminal and the communication terminal are connected to one another via a communication network. The mobile terminal communicates with the prescribed station, and as it moves, it is sequentially switched and connected to one or more arbitrary stations except the prescribed station among the plurality of stations. During this time, the mobile terminal is assigned with a different address from each arbitrary station to which the mobile terminal is connected, for uniquely identifying the mobile terminal in the relevant area. When the system is configured as above, the call setup request receiving unit has a request information receiving unit, and the data sending unit has a sending unit.

The request information receiving unit receives the call setup request information from the communication terminal via an arbitrary station connected to the mobile terminal, the prescribed station and the communication network. The sending unit sends data to the mobile terminal, based on the notified address, via a communication path established after the address was notified. The established communication path is configured with the communication network and the arbitrary station, but not including the prescribed station.

Accordingly, data for which real-time transmission is required is transmitted via the communication path including the communication network, the arbitrary station to which the mobile terminal is connected, but not including the prescribed station, or in other words, via a shortened communication path not relayed by the prescribed station. The notification of an address from the address notification unit to a communication terminal is carried out immediately after a call setup request is made. Thus, transmission delay of the data for which real-time transmission is required is avoided, and, by establishing the above-described communication path, communication load exerted on the prescribed station and the communication network can be reduced.

In the above-described mobile communication system, the address notification unit includes an on-the-move address notification unit. While data is being sent to the mobile terminal by the data sending unit, every time the nomadic, mobile terminal comes to be switched and connected to a new arbitrary station, the on-the-move address notification unit notifies the communication terminal of a new address assigned to the mobile terminal by the new arbitrary station.

Thus, even if the mobile terminal moves, current addresses are constantly assigned thereto, and thus, it becomes possible to transmit data without disconnecting the call having been setup between the mobile terminal and the communication terminal.

In the above-described mobile communication system, the communication network may be the Internet, and the communication between the communication terminal and the mobile terminal may be carried out according to the Mobile Internet Protocol corresponding to Internet Protocol version 4.

The mobile communication method according to another aspect of the present invention is applied to a mobile communication system wherein a communication terminal for communicating with a mobile terminal to transmit data thereto is connected via a communication network to a prescribed station for relaying the communication between the mobile terminal and the communication terminal, and wherein the mobile terminal communicates with the prescribed station, and as it moves, every time it moves in a different area, it is switched and assigned with a new address for uniquely identifying the mobile terminal in the relevant area. The mobile terminal includes a call setup request receiving step, a determination step, and an address notification step, which are carried out while it is moving. The communication terminal includes a data sending step.

When call setup request information is received at the call setup request receiving step for requesting setup of a call for data transmission from the communication terminal via the prescribed station to the mobile terminal, the determination step determines, based on the received call setup request information, whether or not real-time communication is being required for the data. As a result of determination, if it is determined that the real-time communication is required, the address notification step notifies the communication terminal of a currently assigned address. The data sending step then sends data to the mobile terminal based on the notified address, via a communication path that is established including the communication network but not including the prescribed station after the address was notified by the address notification step.

Accordingly, the data for which real-time transmission is required is transmitted via the communication path including the communication network but excluding the prescribed station, or in other words, via a shortened communication path not relayed by the prescribed station. Further, the notification of the address to the communication terminal by the address notification step is carried out immediately after a call setup request is made. Thus, delay in transmission of data requiring real-time transmission is avoided. Further, by establishing the above-described communication path, communication load put on the prescribed station and the communication network can be reduced.

The above-described mobile communication method is also applicable to the case where the mobile communication system is configured as follows. Specifically, a plurality of stations including the prescribed station as described above for relaying the communication between the mobile terminal and the communication terminal are connected to each other via a communication network. The mobile terminal communicates with the prescribed station among the plurality of stations, and as it moves, it is sequentially switched and connected to at least one arbitrary station except for the prescribed station among the plurality of stations. Every arbitrary station to which the mobile terminal is connected assigns an address to the mobile terminal for uniquely identifying the mobile terminal in the relevant area. When applied to such a system, the call setup request receiving step of the mobile communication method includes a request information receiving step, and the data sending step includes a sending step. The request information receiving step receives the call setup request information from the communication terminal via the arbitrary station to which the mobile terminal is connected, the prescribed station and the communication network. The sending step sends the data to the mobile terminal based on the notified address, via a communication path. This communication path is established after the notification of the address by the address notification step, including the communication network and the arbitrary station, but excluding the prescribed station.

Thus, the data requiring real-time transmission is transmitted via the communication path including the arbitrary station and the communication network but not including the prescribed station, or in other words, via a shortened communication path not relayed by the prescribed station. Further, the communication path is established immediately after the call setup request is made. Thus, transmission delay of the data requiring real-time transmission is avoided, and, by establishing the above-described communication path, communication load exerted on the prescribed station and the communication network is reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an example of a send-to address table in the partner appliance PA in each embodiment of the present invention.

FIG. 7 is a flow chart illustrating processing procedures at the mobile node MN shown in FIG. 1.

DESCRIPTION OF THE PREFERRED EMBODIMENTS

Figure 14:
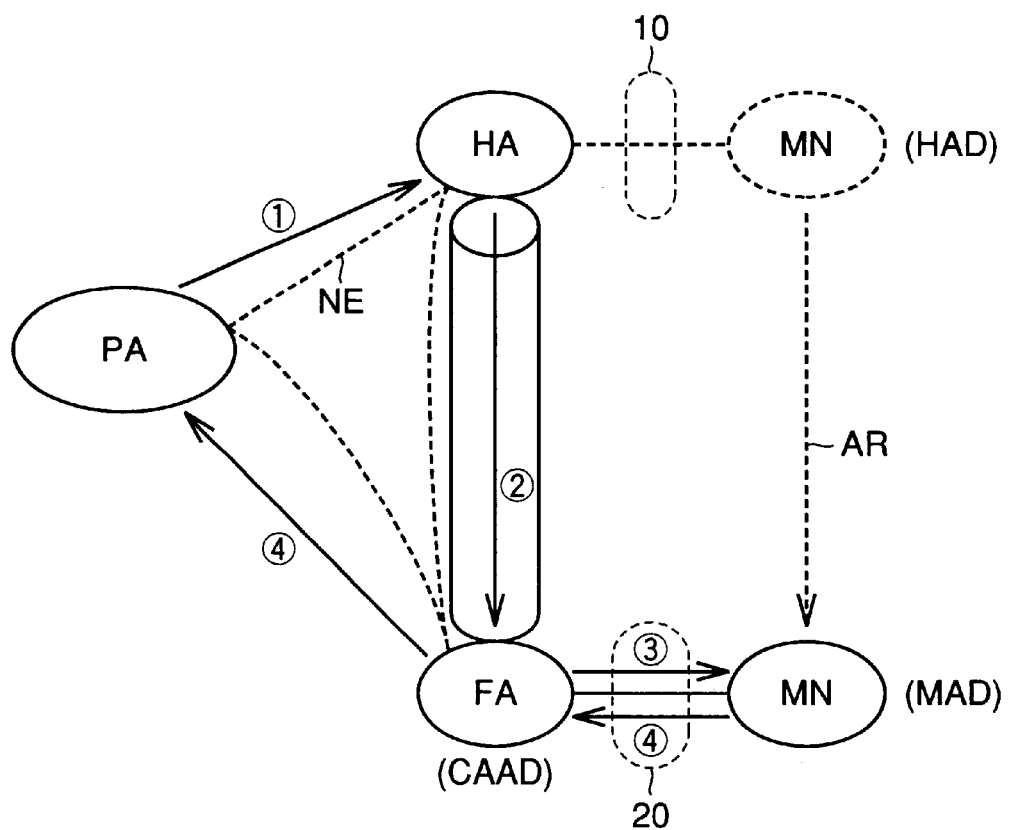
Figure 15:
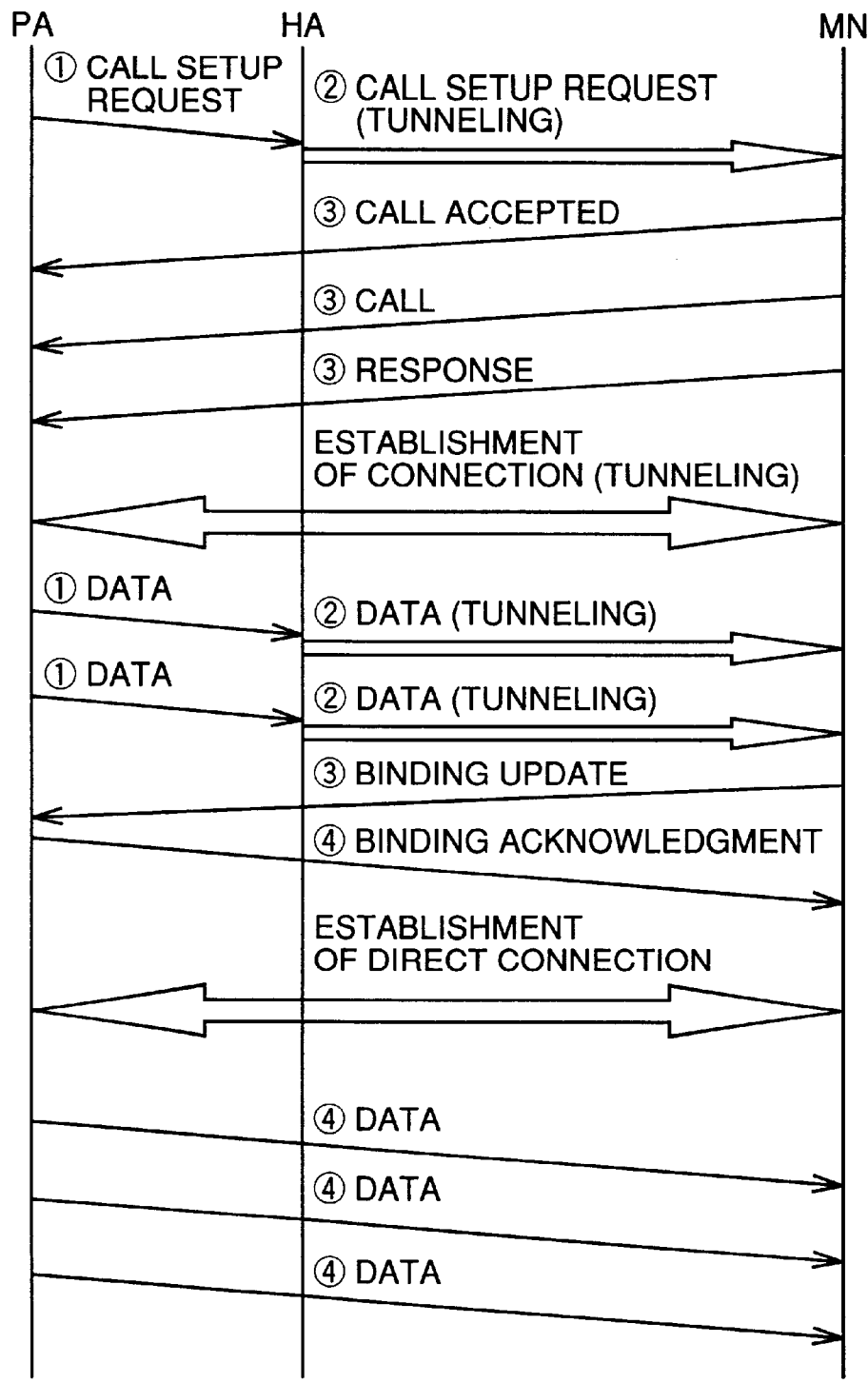
FIGS. 15 and 16 show conventional connecting procedures for communication between partner appliance PA and mobile node MN under IPv6.
Figure 16:
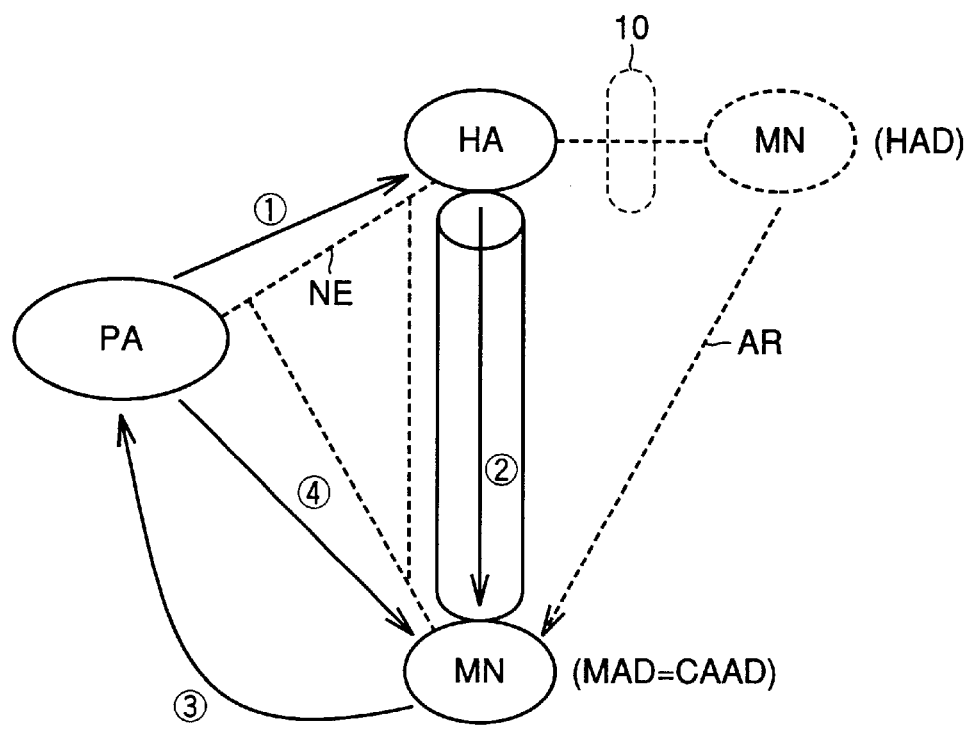

Hereinafter, embodiments of the present invention will be described in detail with reference to the drawings. In each embodiment, the configuration of a system including a partner appliance PA, a mobile node MN, a home agent HA and a foreign agent FA is identical to that shown in FIG. 14 or 16. Thus, detailed description thereof will not be repeated. Further, a home address HAD, a care of address CAAD and a moved address MAD are identical to those illustrated in FIGS. 13–16, and thus, detailed description thereof will not be repeated. Here, for simplification of explanation, communication between one partner appliance PA and one mobile node MN is discussed when explaining and illustrating the communication control procedures. However, the system may be configured to include two or more partner appliances PA and two or more mobile nodes MN. In that case, each partner appliance PA is able to communicate in parallel with the two or more mobile nodes MN, and every mobile node MN can communicate in parallel with the two or more partner appliances PA.

First Embodiment

The first embodiment of the present invention will now be described.

Figure 1:
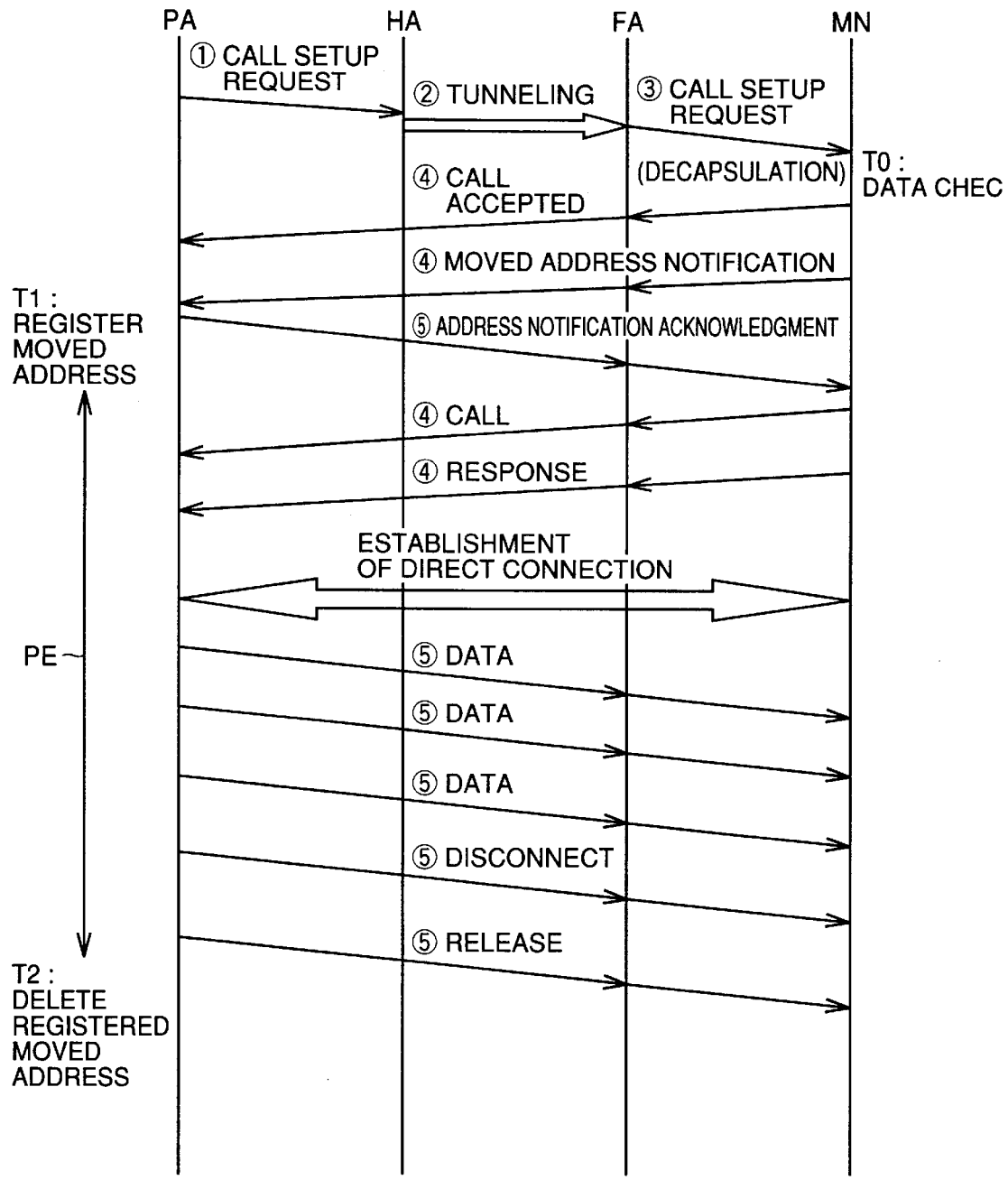
FIG. 1 shows connecting procedures in a communication control method for the Mobile IP under IPv4 according to a first embodiment of the present invention.
Figure 2:
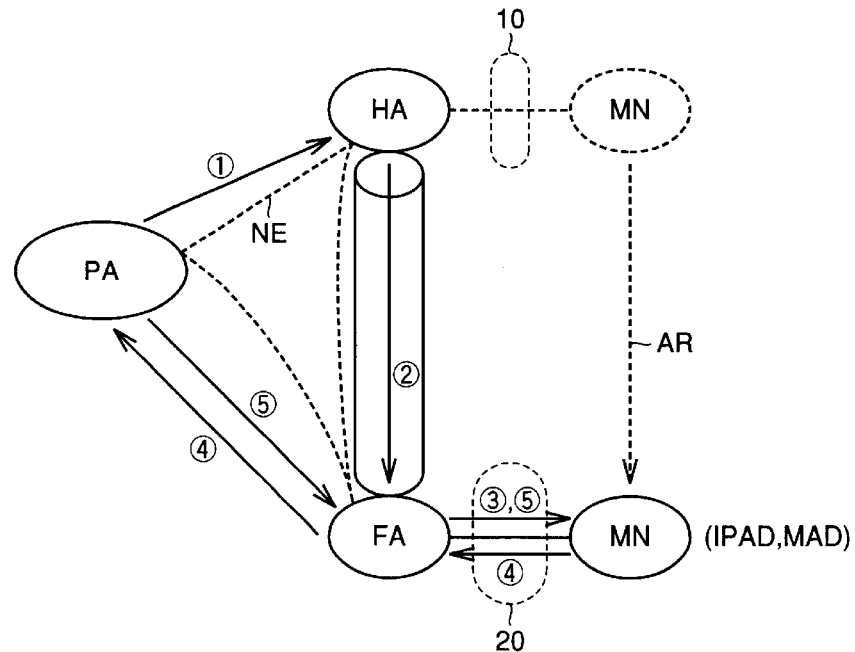
FIG. 2 shows, by way of example, transition in connecting manners between a partner appliance PA and a mobile node MN in the Mobile IP under IPv4 according to the first embodiment.
Figure 3:
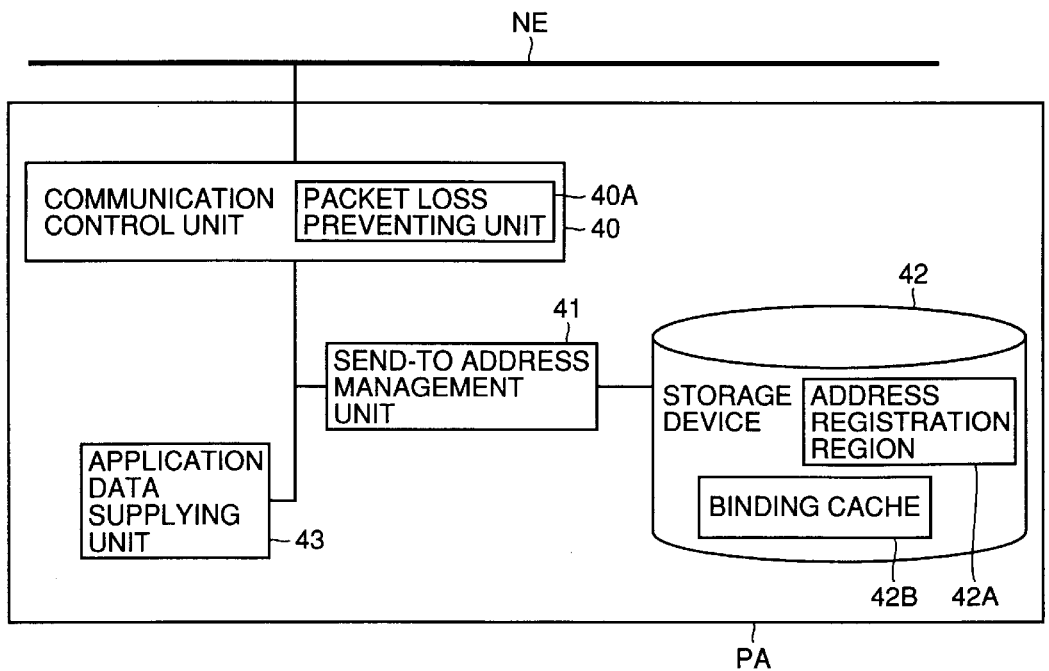
FIGS. 3, 4, and 5 are block configuration diagrams of a partner appliance PA, a home agent HA and a mobile node MN, respectively, to be applied to each embodiment of the present invention.
Figure 4:
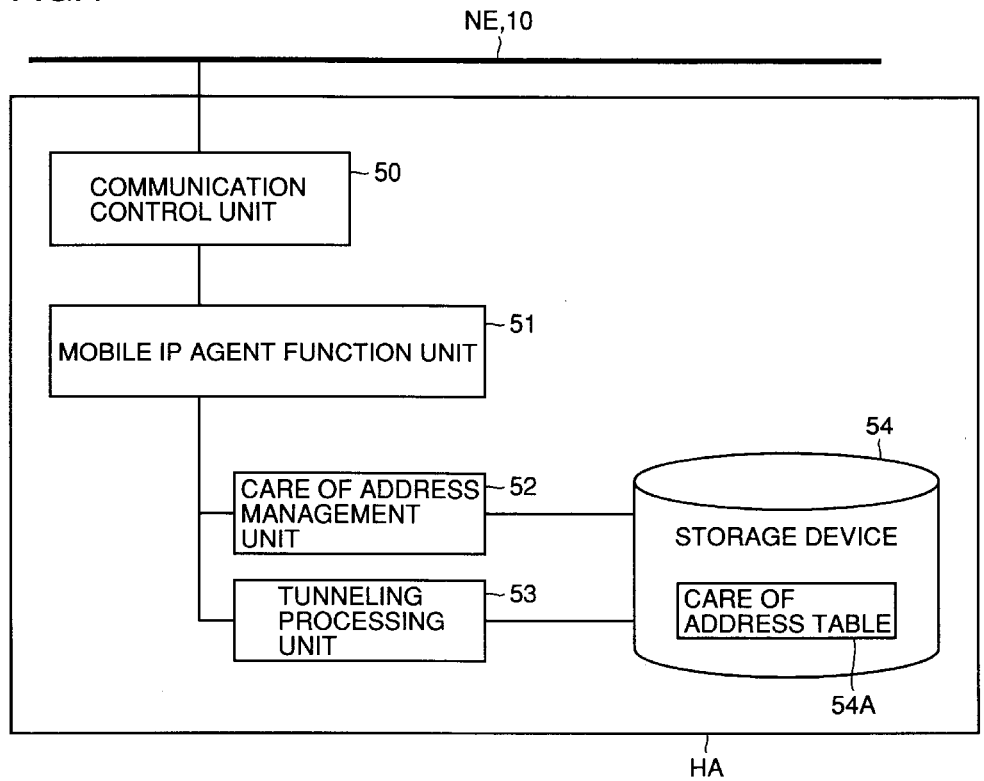
Figure 5:
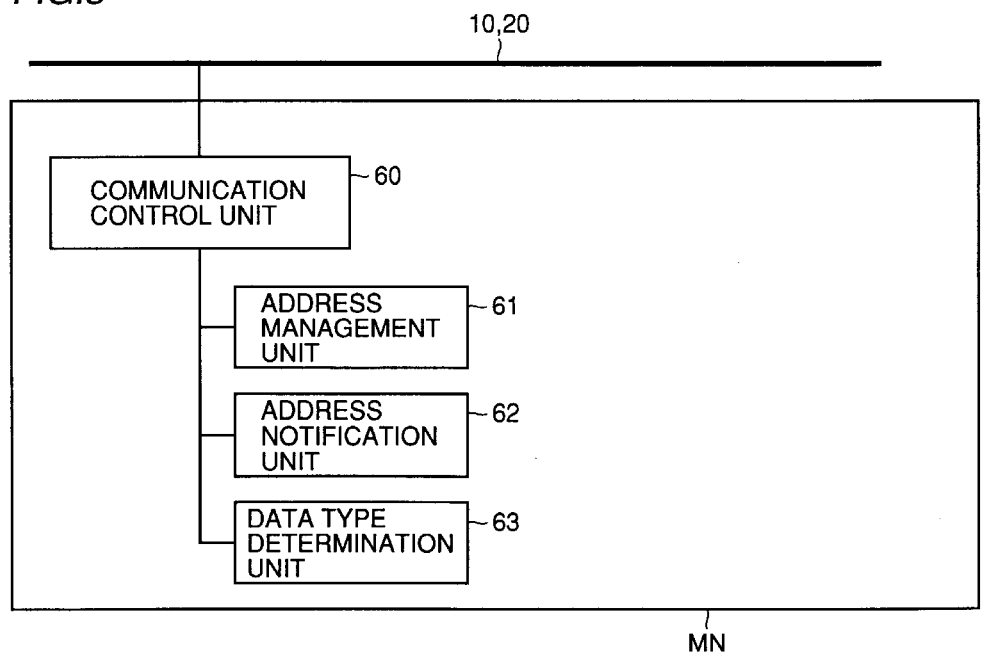

FIG. 1 shows connecting procedures in a communication control method for the Mobile IP under IPv4 according to the first embodiment. FIG. 2 shows, by way of example, transition in connecting manners between partner appliance PA and mobile node MN in the Mobile IP under IPv4 according to the first embodiment. In FIG. 1, communication procedures are shown as ①–⑤. ①–⑤ in FIG. 1 correspond to those in FIG. 2. FIGS. 3, 4 and 5 are block configuration diagrams showing partner appliance PA, home agent HA and mobile node MN, respectively, that are to be applied to each embodiment of the present invention. FIG. 6 shows an example of a send-to address table in partner appliance PA according to each embodiment. FIG. 7 is a flow chart illustrating processing procedures in mobile node MN shown in FIG. 1.

Referring to FIG. 3, partner appliance PA includes: a communication control unit 40 that controls communication of partner appliance PA via communication network NE; a send-to address management unit 41 that manages a send-to address identifying where data should be sent; a storage device 42 that is accessed by send-to address management unit 41 and stores information about an address for communication; and an application data supplying unit 43. Application data supplying unit 43 supplies various kinds of application data including data to be sent to mobile node MN. The application data being supplied may be generated within the device of partner appliance PA, or may be externally received. Storage device 42 includes an address registration region 42A and a binding cache 42B being a cache memory region in which an address for binding update is registered. Communication control unit 40 includes a packet loss preventing unit 40A for preventing failure in receiving packets, or packet loss, in data communication, as will be described later.

In binding cache 42B, a moved address MAD notified by the binding update is registered for the call currently being setup between partner appliance PA and each of at least one mobile node MN.

FIG. 6 shows exemplary contents of address registration region 42A. Referring to FIG. 6, registered in address registration region 42A are, for the call currently being setup between partner appliance PA and each of at least one mobile node MN, a call number CN for identification of the call, and corresponding home address HAD and moved address MAD.

Referring to FIG. 4, home agent HA includes: a communication control unit 50 that controls communication via communication network NE or IP sub-network 10; a Mobile IP agent function unit 51 that performs an agent function regarding the Mobile IP; a care of address management unit 52 that manages a care of address CAAD; a tunneling processing unit 53 that processes tunneling; and a storage device 54 that is accessed by both care of address management unit 52 and tunneling processing unit 53 and stores information regarding communication. Storage device 54 includes a care of address table 54A in which at least one care of address CAAD is registered. Foreign agent FA has a configuration approximately the same as that of home agent HA, and thus, description thereof will not be repeated.

Referring to FIG. 5, mobile node MN includes: a communication control unit 60 that controls communication via IP sub-network 10 or 20; an address management unit 61 that manages addresses (home address HA, moved address MAD, and care of address CAAD) for communication; an address notification unit 62 that reads out an address, e.g., moved address MAD, from address management unit 61 for externally notifying thereof; and a data type determination unit 63 that determines the type of the data received via communication control unit 60. Data type determination unit 63 performs a data checking process, as will be described later.

Communication control procedures according to the present embodiment will now be described with reference to FIGS. 1 and 2.

Referring to FIG. 2, assume that mobile node MN that was being connected to IP sub-network 10 of home agent HA moves in a direction indicated by a dashed arrow AR and now is connected with IP sub-network 20 (foreign link) corresponding to foreign agent FA. Once mobile node MN is connected to the foreign link of foreign agent FA, it acquires from foreign agent FA, care of address CAAD being a global address indicating its current location, and a temporary moved address MAD being a local address. Address notification unit 62 then notifies home agent HA of the care of address CAAD. Thereafter, transmission of a message from partner appliance PA to mobile node MN is carried out as follows.

Specifically, when partner appliance PA sends "call setup request" for a message according to Q.931, etc., to home agent HA, home agent HA receives the request and transmits it as capsulated data to foreign agent FA by tunneling (①, ②). Foreign agent FA receives the capsulated data, performs decapsulation, and sends the decapsulated call setup request to mobile node MN (③). Upon receipt of the call setup request, mobile node MN notifies partner appliance PA, via foreign agent FA, of "call accepted" indicating that it accepted the call setup request (④). Thus, a call number CN, corresponding to the call, is registered in the address registration region 42A of partner appliance PA. At this time, in mobile node MN, the data received from partner appliance PA is checked by data type determination unit 63 for determination of the type of the received data (T0 in FIG. 1). In this data checking, a determination is made whether the data being sent from mobile node MN is involving images, sounds and the like that require real-time transmission and processing, based on the information about the data type that is included in the information, received with the call setup request, indicating data transfer capability.

When it is determined that the data is of the type requiring real-time transmission and processing, mobile node MN directly sends the notification of moved address MAD to partner appliance PA (④). Partner appliance PA accepts moved address MAD notified from mobile node MN, registers it in address registration region 42A (T1 in FIG. 1), and directly sends an acknowledgment of the notification of moved address MAD to mobile node MN (⑤). Upon receipt of the address notification acknowledgment, mobile node MN directly sends "call" and "response" to partner appliance PA (④). Thus, a direct connection that is not intervened by home agent HA is established between partner appliance PA and mobile node MN. While this direct connection is being maintained, partner appliance PA sends data to moved address MAD that is registered in address registration region 42A (⑤). Thereafter, when partner appliance PA sends a notification to mobile node MN indicating "disconnect" and "release" of the call (⑤), the corresponding call number CN and moved address MAD registered in address registration region 42A of partner appliance PA are deleted (T2 of FIG. 1).

Processing at mobile node MN corresponding to the above-described communication control procedures from "call setup request" ③ → "moved address notification" ④ → "moved address notification acknowledgment" ⑤ will now be described with reference to FIG. 7. In step S1 in FIG. 7, mobile node MN receives "call setup request" from partner appliance PA via home agent HA (①–③ in FIG. 1). In step S2, mobile node MN sends "call accepted" to partner appliance PA (④ in FIG. 1). In step S3, a type of data being transmitted from partner appliance PA is checked (T0 in FIG. 1). In step S4, as a result of the data checking in step S3, a determination is made whether the data being transmitted from partner appliance PA is of the kind requiring real-time transmission and processing, e.g., data in accordance with Real-time Transport Protocol (RTP). If not, a connection is established via home agent HA as in the conventional case. If the data is of the kind that requires real-time transmission and processing, then in step S5, address notification unit 62 notifies partner appliance PA of moved address MAD (④ in FIG. 1). In step S6, if an acknowledgment of the notification of moved address MAD is received from partner appliance PA (⑤ in FIG. 1), then a direct connection that is not intervened by home agent HA is established between mobile node MN and partner appliance PA. If the moved address notification acknowledgement is not received in step S6, a connection via home agent HA is established.

Therefore, according to the present embodiment, compared to the case where data transmission is made by tunneling via home agent HA between partner appliance PA and mobile node MN as in the conventional mobile communication method under IPv4, transmission delay of application data for images or sounds requiring real-time transmission is prevented since a redundant transmission path is avoided. Further, what is needed to be registered in address registration region 42A of partner appliance PA is only the moved address MAD related to the currently connected call, which is kept only during the time period shown by an arrow PE in FIG. 1. Therefore, it is possible to save resource consumption of the device of partner appliance PA. In addition, notification of the moved address MAD from mobile node MN to partner appliance PA is performed only if necessary. Therefore, it becomes unnecessary to constantly exert load on the network in connection with the communication control for the purposes of confirmation of the communication path.

Second Embodiment

The second embodiment of the present invention will now be described.

Figure 8:
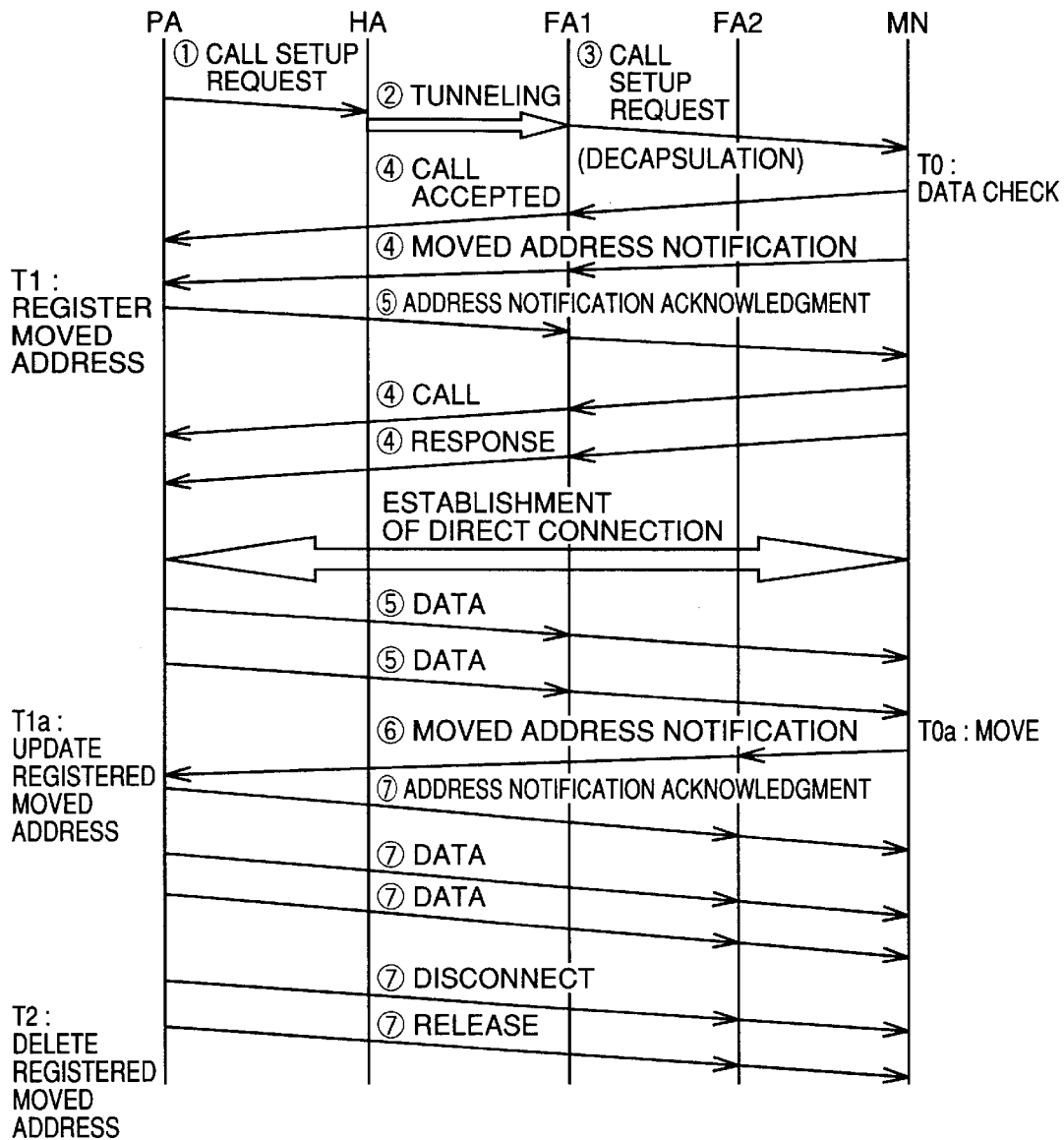
FIG. 8 shows connecting procedures in a communication control method for the Mobile IP under IPv4 according to a second embodiment of the present invention.
Figure 9:
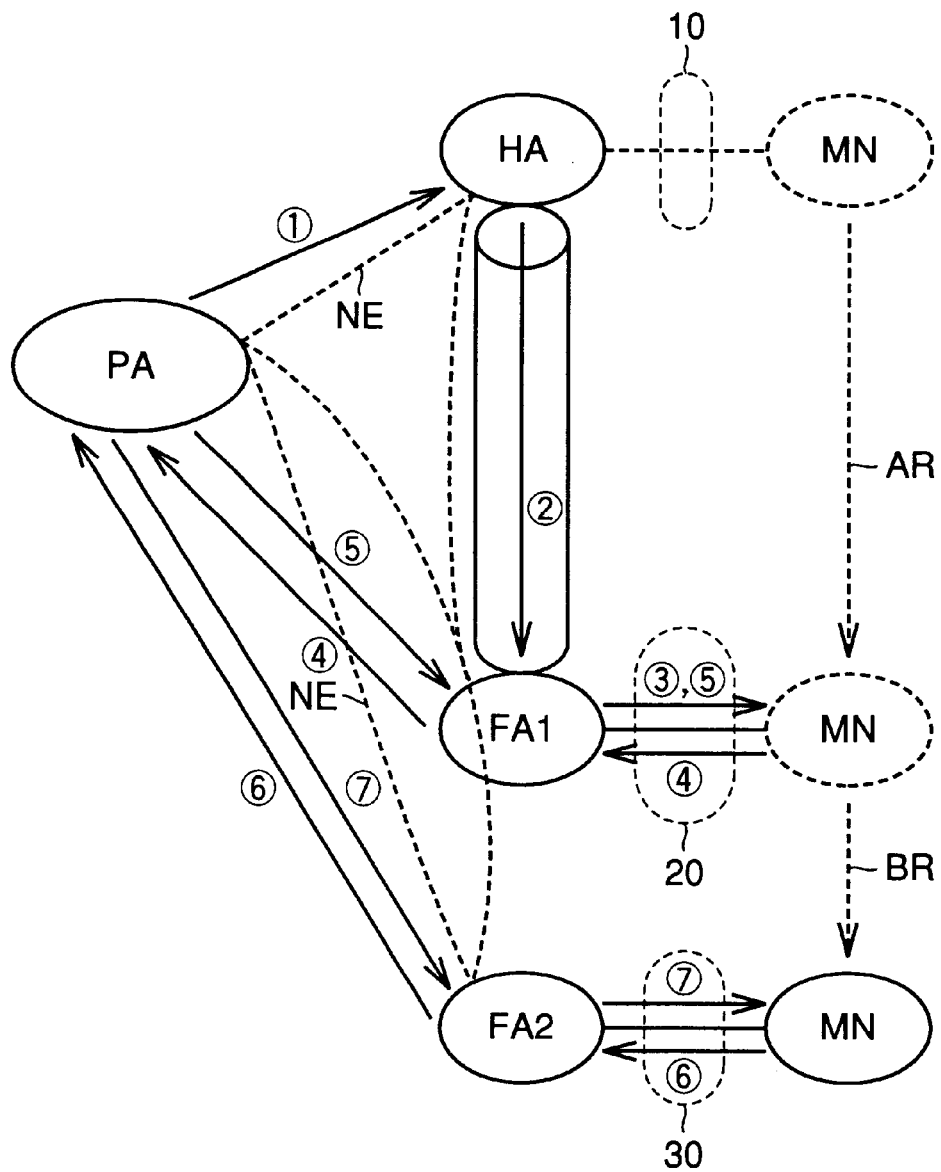
FIG. 9 shows, by way of example, transition in connecting manners between partner appliance PA and mobile node MN in the Mobile IP under IPv4 according to the second embodiment.

FIG. 8 illustrates connecting procedures in a communication control method for the Mobile IP under IPv4 according to the second embodiment of the present invention. FIG. 9 shows, by way of example, transition in connecting manners between partner appliance PA and mobile node MN in the Mobile IP under IPv4 according to the second embodiment. In FIGS. 8 and 9, foreign agents FA1 and FA2, operating similarly to foreign agent FA as described above, belong to different IP sub-networks 20 and 30, respectively. In FIG. 8, communication procedures are shown as ①–⑦. ①–⑦ in FIG. 8 correspond to those in FIG. 9.

In the present embodiment, mobile node MN that was being connected to home agent HA via IP sub-network 10 moves in a direction indicated by a dashed arrow AR in FIG. 9, and comes to be connected to IP sub-network 20 of foreign agent FA1. Mobile node MN then starts to send information directly to partner appliance PA according to the connecting procedures as described in the first embodiment. While the data is being sent directly as above, mobile node MN further moves in a direction indicated by a dashed arrow BR, and comes to be connected to another foreign agent FA2 via IP sub-network 30. The method for controlling communication between mobile node MN and partner appliance PA at this time will now be described.

Procedures from the time when mobile node MN starts to move in the direction indicated by dashed arrow AR in FIG. 9 to the time when it starts to directly send information to partner appliance PA via foreign agent FA1 (①–⑤ in FIGS. 8 and 9) are the same as in the first embodiment, and therefore, description thereof will be not repeated.

When mobile node MN, while communicating data with partner appliance PA, further moves in the direction indicated by dashed arrow BR in FIG. 9 (T0a in FIG. 8), it comes to be connected to IP sub-network 30 of foreign agent A2, and therefore, it becomes unable to receive data ⑤ via foreign agent FA1. At this time, mobile node MN acquires a new moved address MAD from foreign agent FA2, and notifies, by address notification unit 62, partner appliance PA of this new address via foreign agent FA2 (⑥ in FIG. 8). When partner appliance PA receives the new moved address MAD, the corresponding moved address MAD having been registered in address registration region 42A is updated by the newly received moved address MAD (T1a), and then an acknowledgment of the notification of the new moved address MAD is sent to mobile node MN (⑦ in FIG. 8). Thereafter, partner appliance PA is able to directly send data requiring real-time transmission and processing to mobile node MN, using the new moved address MAD (⑦ in FIG. 8). When partner appliance PA transmits notifications of "disconnect" and "release" of the call to mobile node MN (⑦), the corresponding call number CN and the relevant moved address MAD registered in address registration region 42A in partner appliance PA are deleted therefrom (T2 in FIG. 8).

Thus, according to the present embodiment, every time mobile node MN moves and comes to be connected to a different foreign link, mobile node MN is able to acquire a new moved address MAD. Therefore, the communication between mobile node MN and partner appliance PA can be maintained without disconnecting the call having been setup for the call originated from partner appliance PA.

In the above-described connection control procedures, if partner appliance PA receives from mobile node MN a notification of moved address MAD for a call that is on the way to setup, failure in receiving packets, or packet loss, is likely to occur in the data communication. As the countermeasures thereto, partner appliance PA may be configured to retransmit some of the data by means of packet loss preventing unit 40A, or, to suspend data transmission for a while, so as to further improve communication quality.

Third Embodiment

Figure 10:
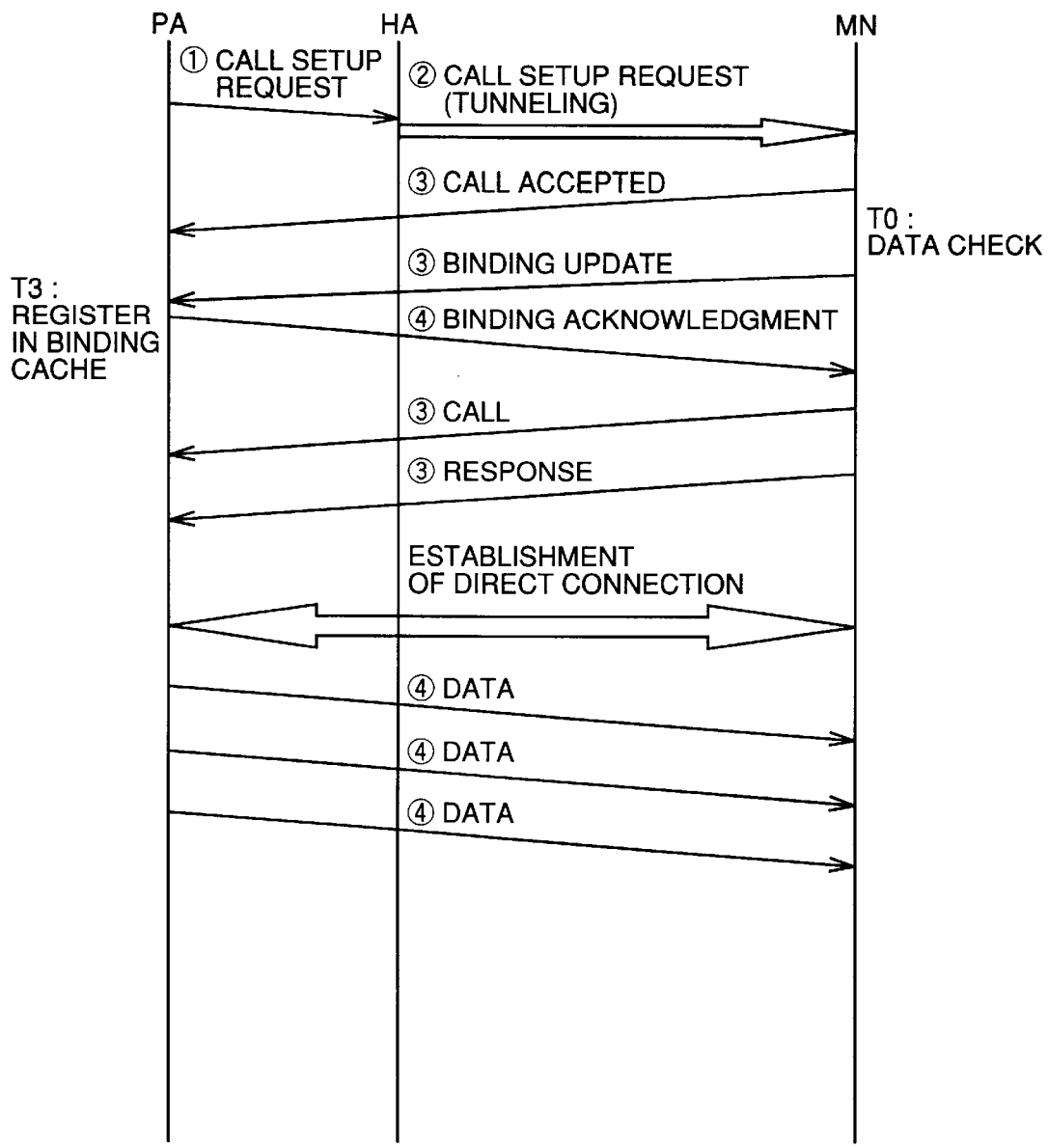
FIG. 10 shows connecting procedures in a communication control method for the Mobile IP under IPv6 according to a third embodiment of the present invention.
Figure 11:
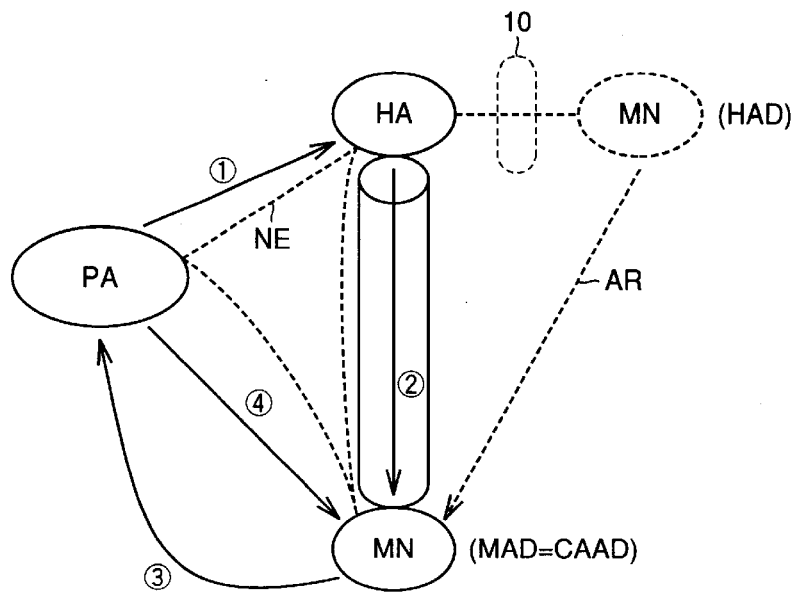
FIG. 11 shows, by way of example, transition in connecting manners between partner appliance PA and mobile node MN in the Mobile IP under IPv6 according to the third embodiment.
Figure 12:
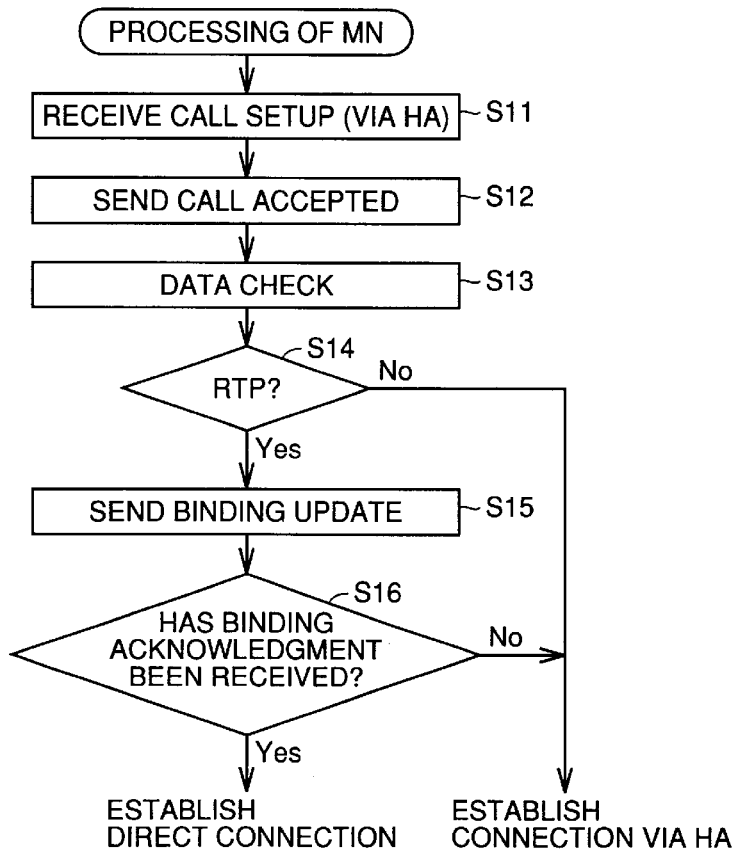
FIG. 12 is a flow chart illustrating processing at mobile node MN according to the third embodiment.
Figure 13:
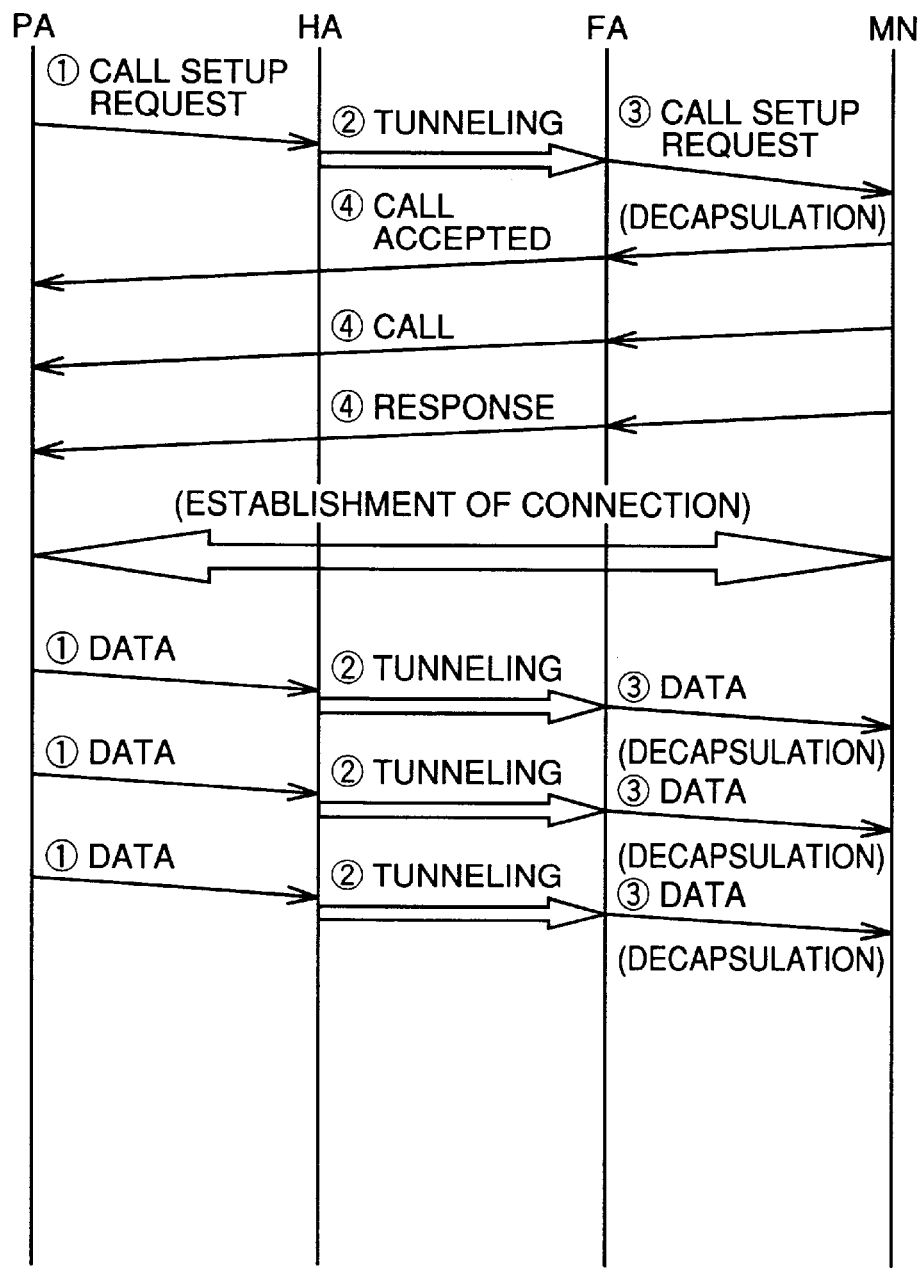
FIGS. 13 and 14 show conventional connecting procedures for communication between partner appliance PA and mobile node MN under IPv4.

The third embodiment of the present invention will now be described. FIG. 10 shows connecting procedures in a communication control method for the Mobile IP under IPv6 according to the third embodiment. FIG. 11 shows, by way of example, transition in connecting manners between partner appliance PA and mobile node MN in the Mobile IP under IPv6 according to the third embodiment. FIG. 12 is a processing flow chart of mobile node MN according to the third embodiment. Communication procedures are shown as ①–④ in FIG. 10. ①–④ in FIG. 10 correspond to those in FIG. 11.

As shown in FIG. 11, when mobile node MN is connected to IP sub-network 10 of home agent HA, it is provided with home address HAD. Thereafter, as it moves in the dashed arrow AR and comes to be connected to another foreign link of another foreign agent FA (not shown), mobile node MN acquires a moved address MAD (=care of address CAAD) from a server (not shown) on communication network NE, and notifies home agent HA of the moved address MAD, although the way of acquiring the moved address MAD is not limited thereto. Thereafter, transmission of a message from partner appliance PA to this mobile node MN is carried out as follows.

Referring to FIG. 10, when partner appliance PA sends "call setup request" for a message to home agent HA, home agent HA receives the call setup request, and sends it as capsulated data to mobile node MN by tunneling ((①, ②)). When mobile node MN accepts the call setup request, it sends to partner appliance PA "call accepted" that indicates that the call setup request was accepted ((③)), and performs decapsulation of the capsulated data, and then performs data checking (T0). By this data checking, it is determined whether the data being transmitted from partner appliance PA is of the type involving images, sounds and the like, that requires real-time transmission and processing. If so, mobile node MN directly sends "binding update" to partner appliance PA ((③)). Upon receipt of the binding update, partner appliance PA registers in a binding cache 42B a current moved address MAD of the relevant mobile node MN that was notified by the binding update (T3), and directly sends "binding acknowledgment" to mobile node MN ((④)). When mobile node MN receives the binding acknowledgment, it sends "call" and "response" to partner appliance PA ((③)). Thus, a direct connection is established between partner appliance PA and mobile node MA. While this direct connection is being maintained, partner appliance PA uses the corresponding moved address MAD registered in binding cache 42B for directly sending data to mobile node MN ((④)).

FIG. 12 shows processing procedures performed by mobile node MN in the above-described connection control procedures, corresponding to "call setup request" ② → "binding update" ③ → "binding acknowledgment" ④. The operation of mobile node MN will now be described with reference to FIG. 12.

In step S11 of FIG. 12, mobile node MN receives "call setup request" from partner appliance PA via home agent HA (① in FIG. 10). Then in step S12, mobile node MN sends "call accepted" to partner appliance PA (② in FIG. 10). In step S13, data check is performed (T0 in FIG. 10). In step S14, a determination is made, using a result of the data check, whether the data being transmitted from partner appliance PA is of the type that requires real-time transmission and processing, e.g., RTP data. If not (NO in S14), a connection is established via home agent HA as in the conventional case. If the data is of the type that requires real-time transmission and processing, then in step S15, mobile node MN notifies partner appliance PA of "binding update" (③ in FIG. 10). In step S16, a determination is made whether "binding acknowledgment" has been received from partner appliance PA. If so, a direct connection is established between partner appliance PA and mobile node MN that is not relayed by home agent HA. If the binding acknowledgment is not received, a connection via home agent HA is established.

According to the present embodiment, mobile node MN instantly responds to the receipt of the call setup request and notifies of the binding update. This prevents a redundant communication path as in the conventional case from being established from the time when the call setup request was received to the time when the binding update is notified. Accordingly, transmission delay of application data for images, sounds and the like that requires real-time transmission and processing is prevented.

In the present embodiment, mobile node MN acquires a new moved address MAD every time it moves and comes to be connected to a different foreign link. Therefore, whenever mobile node MN is connected to a different foreign link and acquires a new moved address MAD, it notifies partner appliance PA of binding update. In response, partner appliance PA updates a corresponding moved address MAD having been registered in binding cache 42B, using the new moved address MAD that is received by the notification of the binding update.

In respective embodiments described above, it is determined, by data check, whether or not data being transmitted from partner appliance PA is of the kind that requires real-time transmission and processing, and, according to a result of the data check, it is determined which to establish, a direct connection or a connection via home agent HA, between partner appliance PA and mobile node MN. Alternatively, it may be configured such that a direct connection is always established if, for example, it is known in advance that the data being transmitted is always of the kind that requires the real-time transmission and processing.

In address registration region 42A and binding cache 42B, data being registered corresponding to each call is retained (kept registered) only while a connection is being maintained between corresponding mobile node MN and partner appliance PA. When the connection is released (disconnected), such data is no longer necessary, and may be deleted from address registration region 42A and binding cache 42B. Accordingly, only small memory capacity is required in partner appliance PA as a sender of data to mobile node MN.

According to the respective embodiments as described above, data requiring real-time transmission and processing is directly sent from partner appliance PA to mobile node MN, not by tunneling via home agent HA. Accordingly, data transmission delay is avoided. Further, in the connecting procedures for enabling such direct sending, the amount of messages transmitted on the IP network including communication network NE is reduced, thereby alleviating the load exerted on the IP network. When the connection enabling the direct sending is established, communication load exerted on home agent HA is also reduced. In partner appliance PA on the data sending terminal side, address information required for the connection needs to be stored only while such connection is being maintained. This means that only small storage capacity is required for storage device 42. As this address information is stored in partner appliance PA only temporarily, a relatively inexpensive storage element, e.g., RAM, can be utilized, whereby the cost of the device of partner appliance PA can be reduced.

Although the present invention has been described and illustrated in detail, it is clearly understood that the same is by way of illustration and example only and is not to be taken by way of limitation, the sprit and scope of the present invention being limited only by the terms of the appended claims.

What is claimed is:

1. A mobile communication system, comprising a communication terminal that communicates with a mobile terminal for transmitting data to said mobile terminal and a prescribed station that relays communication between said mobile terminal and said communication terminal being connected to each other via a communication network, said mobile terminal communicating with said prescribed station and, as it moves, being switched and assigned with an address for every different visited area, for uniquely identifying the mobile terminal, characterized in that said mobile terminal includes, for use while moving, call setup request receiving means for receiving, from said communication terminal via said prescribed station, call setup request information that requests setup of a call for transmission of said data, determination means for determining, based on said call setup request information received by said call setup request receiving means, whether real-time communication is required for said data, and address notification means, when said determination means determines that said real-time communication is required, for notifying said communication terminal of said address currently assigned to the mobile terminal, and said communication terminal includes data sending means for sending said data to said mobile terminal based on said address notified, via a communication path including said communication network but excluding said prescribed station that is established after said address was notified by said address notification means.

2. The mobile communication system according to claim 1, wherein said address notification means has on-the-move address notification means, while said data is being sent to said mobile terminal by said data sending means, every time said mobile terminal further moves and is assigned with another said address, for notifying said communication terminal of said another address assigned to said mobile terminal.

3. The mobile communication system according to claim 2, wherein said communication terminal further includes address storage means in which said address notified by said address notification means is stored corresponding to said call, and every time said another address is notified from said address notification means, said address stored in said address storage means is updated using said notified another address.

4. The mobile communication system according to claim 3, wherein said communication path is established corresponding to said call for which said call setup request information was received by said call setup request receiving means, and when said call is released, said address corresponding to the call in said address storage means is deleted.

5. The mobile communication system according to claim 2, wherein said data sending means prevents failure in receiving packets in connection with sending of said data that may occur when said address is notified.

6. The mobile communication system according to claim 5, wherein said data sending means suspends said data sending when said address is notified.

7. The mobile communication system according to claim 5, wherein said data sending means re-transmits said data when said address is notified.

8. The mobile communication system according to claim 1, wherein said communication network is the Internet.

9. The mobile communication system according to claim 8, wherein the communication between said communication terminal and said mobile terminal is carried out according to the Internet Protocol for the mobile communication.

10. The mobile communication system according to claim 9, wherein said Internet Protocol corresponds to Internet Protocol version 4.

11. The mobile communication system according to claim 9, wherein said Internet Protocol corresponds to Internet Protocol version 6.

12. The mobile communication system according to claim 1, wherein in the case where a plurality of stations including said prescribed station for relaying the communication between said mobile terminal and said communication terminal are connected to each other via said communication network, and said mobile terminal communicates with said prescribed station among said plurality of stations, and as it moves, is sequentially switched and connected to at least one arbitrary station among said plurality of stations excluding said prescribed station, and is assigned with said address from said arbitrary station to which the mobile terminal is connected, for uniquely identifying the mobile terminal, said call setup request receiving means has request information receiving means for receiving said call setup request information from said communication terminal via said arbitrary station to which said mobile terminal is connected, said prescribed station and said communication network, and said data sending means has sending means for sending said data to said mobile terminal based on said address notified, via said communication path including said communication network and said arbitrary station to which the mobile terminal is connected but excluding said prescribed station that is established after said address was notified by said address notification means.

13. The mobile communication system according to claim 12, wherein said address notification means has on-the-move address notification means, while said data is being sent by said data sending means to said mobile terminal, every time said mobile terminal further moves and comes to be switched and connected to another said arbitrary station, for notifying said communication terminal of said address assigned to the mobile terminal by said another arbitrary station to which the mobile terminal is connected.

14. The mobile communication system according to claim 12, wherein said communication network is the Internet, and the communication between said communication terminal and said mobile terminal is carried out according to the Internet Protocol for the mobile communication corresponding to Internet Protocol version 4.

15. A mobile communication method applied to a mobile communication system wherein a communication terminal communicating with a nomadic mobile terminal for transmitting data to said mobile terminal and a prescribed station for relaying communication between said mobile terminal and said communication terminal are connected to each other via a communication network, and wherein said mobile terminal communicates with said prescribed station and, as it moves, is switched and assigned with an address for every different visited area for uniquely identifying the mobile terminal, the method comprising:

in said mobile terminal, while moving, a call setup request receiving step for receiving, from said communication terminal via said prescribed station, call setup request information for requesting setup of a call for transmission of said data;

a determination step for determining, based on said call setup request information received by said call setup request receiving step, whether real-time communication is required for said data; and an address notification step, when it is determined by said determination step that said real-time communication is required, for notifying said communication terminal of said address currently assigned to the mobile terminal; and in said communication terminal, a data sending step for sending said data to said mobile terminal based on said address notified, via a communication path established after said address was notified by said address notification step and configured to include said communication network but exclude said prescribed station.

16. The mobile communication method according to claim 15, wherein in the case where said mobile communication system has a plurality of stations including said prescribed station for relaying the communication between said mobile terminal and said communication terminal connected to each other via said communication network, and said mobile terminal communicates with said prescribed station among said plurality of stations, and, as it moves, is sequentially switched and connected to at least one arbitrary station among said plurality of stations except said prescribed station, and is assigned with an address from said arbitrary station to which the mobile terminal is connected, for uniquely identifying the mobile terminal, said call setup request receiving step includes a request information receiving step for receiving said call setup request information from said communication terminal via said arbitrary station to which said mobile terminal is connected, said prescribed station and said communication network, and said data sending step includes a sending step for sending said data to said mobile terminal based on said address notified, via said communication path including said communication network and said arbitrary station to which the mobile terminal is connected but excluding said prescribed station that is established after said address was notified by said address notification step.

* * * * *